(12) United States Patent
Balasaygun et al.

(10) Patent No.: US 10,931,719 B2
(45) Date of Patent: Feb. 23, 2021

(54) EARLY MEDIA HANDLING

(71) Applicant: Avaya Inc., Santa Clara, CA (US)

(72) Inventors: Mehmet C. Balasaygun, Freehold, NJ (US); Gordon R. Brunson, Broomfield, CO (US); Joel M. Ezell, Broomfield, CO (US); Eric D. Cooper, Kanata (CA); Rifaat Shekh-Yusef, Belleville (CA)

(73) Assignee: Avaya Inc., Santa Clara, CA (US)

( * ) Notice: Subject to any disclaimer, the term of this patent is extended or adjusted under 35 U.S.C. 154(b) by 1569 days.

(21) Appl. No.: 14/691,253

(22) Filed: Apr. 20, 2015

(65) Prior Publication Data

US 2016/0308915 A1 Oct. 20, 2016

(51) Int. Cl.
*H04L 29/06* (2006.01)
(52) U.S. Cl.
CPC ...... *H04L 65/1006* (2013.01); *H04L 65/1069* (2013.01); *H04L 65/1096* (2013.01)
(58) Field of Classification Search
CPC ............. H04L 65/1006; H04L 65/1069; H04L 65/1096
USPC ........................................................ 709/228
See application file for complete search history.

(56) References Cited

U.S. PATENT DOCUMENTS

2005/0018659 A1* 1/2005 Gallant ............. H04L 29/06027
370/352
2005/0289222 A1* 12/2005 Sahim ............... H04L 29/06027
709/206
2006/0250988 A1* 11/2006 Garcia .............. H04L 29/06027
370/260
2007/0002775 A1* 1/2007 Belling ................... H04L 29/06
370/260
2007/0058537 A1* 3/2007 Belling ............. H04L 29/06027
370/230
2009/0110171 A1* 4/2009 Kannan ............... H04L 65/1033
379/207.16
2009/0225745 A1* 9/2009 Jackson .................. H04M 3/02
370/352

(Continued)

OTHER PUBLICATIONS

Okumura et al., RFC 6337: "Session Initiation Protocol (SIP) Usage of the Offer/Answer Model", Aug. 2011.*

(Continued)

*Primary Examiner* — James E Springer
(74) *Attorney, Agent, or Firm* — Sheridan Ross P.C.

(57) ABSTRACT

A communication device sends a Session Initiation Protocol (SIP) INVITE message to establish a call. In response, the call is forked. For example, in parallel forking, the SIP INVITE may be sent to two different communication devices. The forking causes each communication device to send at least one provisional response message. In this case, first and second SIP provisional response messages are received that include Session Description Protocol (SDP) information for a media stream. A first media stream associated with one of the first or second SIP provisional response messages is received and played. A second media stream associated with the other one of the first or second SIP provisional response messages is received within a first time period. In response to receiving the second media stream within the first time period, the first media stream is discarded and the second media stream is played.

20 Claims, 5 Drawing Sheets

(56) References Cited

U.S. PATENT DOCUMENTS

| | | | | |
|---|---|---|---|---|
| 2012/0166652 | A1* | 6/2012 | Bouthemy | H04L 65/1016 709/227 |
| 2013/0100859 | A1* | 4/2013 | Martin | H04M 15/48 370/259 |
| 2013/0246632 | A1* | 9/2013 | Ginde | H04L 65/1006 709/227 |
| 2016/0029228 | A1* | 1/2016 | Mufti | H04W 24/04 370/225 |
| 2016/0156782 | A1* | 6/2016 | Mumick | H04W 4/14 455/413 |
| 2017/0332153 | A1* | 11/2017 | Shilling | H04Q 1/46 |

OTHER PUBLICATIONS

Rosenberg et al., RFC 3311: "The Session Initiation Protocol (SIP) Update Method".*

* cited by examiner

EARLY MEDIA HANDLING

TECHNICAL FIELD

The systems and methods disclosed herein relate to communication devices and in particular to handling of early media in communication devices.

BACKGROUND

Early media handling is where a call is initially setup with a non-human entity, such as an Interactive Voice Response (IVR) system, media streamer, contact center queue, etc. In the Session Initiation Protocol (SIP), when a call is connected to a non-human entity, the system responds using defined SIP provisional response messages.

The use of SIP provisional response messages works fine for regular SIP calls where there is a 1 to 1 correlation of caller to callee. However, when a call is parallel forked (e.g., sent to multiple communication devices at the same time) or sequentially forked (e.g., transferred in a sequence if unanswered), this can result in multiple provisional response messages being sent in response to an initial SIP INVITE. Current SIP standards do not define how to properly deal with the situation of receiving multiple SIP provisional response messages. In addition, forking can result in one or more early media streams being sent. These early media streams can result in unexpected problems, particularly if multiple early media streams are sent at the same time.

SUMMARY

Systems and methods are provided to solve these and other problems and disadvantages of the prior art. A communication device sends a Session Initiation Protocol (SIP) INVITE message to establish a call. In response, the call is parallel forked. For example, in parallel forking, the SIP INVITE may be sent to two different communication devices at the same time. The forking causes each communication device to send at least one provisional response message. In this example, first and second SIP provisional response messages are received that include Session Description Protocol (SDP) information. The SDP information indicates that there is a media stream associated with the SIP provisional response message. A first media stream associated with one of the first or second SIP provisional response messages is received and played. A second media stream associated with the other one of the first or second SIP provisional response messages is received within a first time period. In response to receiving the second media stream within the first time period, the first media stream is discarded and the second media stream is played. In addition, as the forked call progresses, the media streams are managed along with local progress tones when necessary.

In another embodiment, a Session Initiation Protocol (SIP) INVITE message to establish a call is sent. A timer is started to detect sequential forking. A first provisional response message is received in response to sending the session initiation message. A first media stream associated with the SIP INVITE is received. The first media stream is played. A second provisional response message is received after the timer to detect sequential forking has expired. This indicates that the call has been sequentially forked. In response to receiving the second provisional response message after the timer to detect sequential forking has expired, the system plays a local progress tone and/or plays an early media stream associated with the second provisional response message.

DETAILED DESCRIPTION

Figure 1:
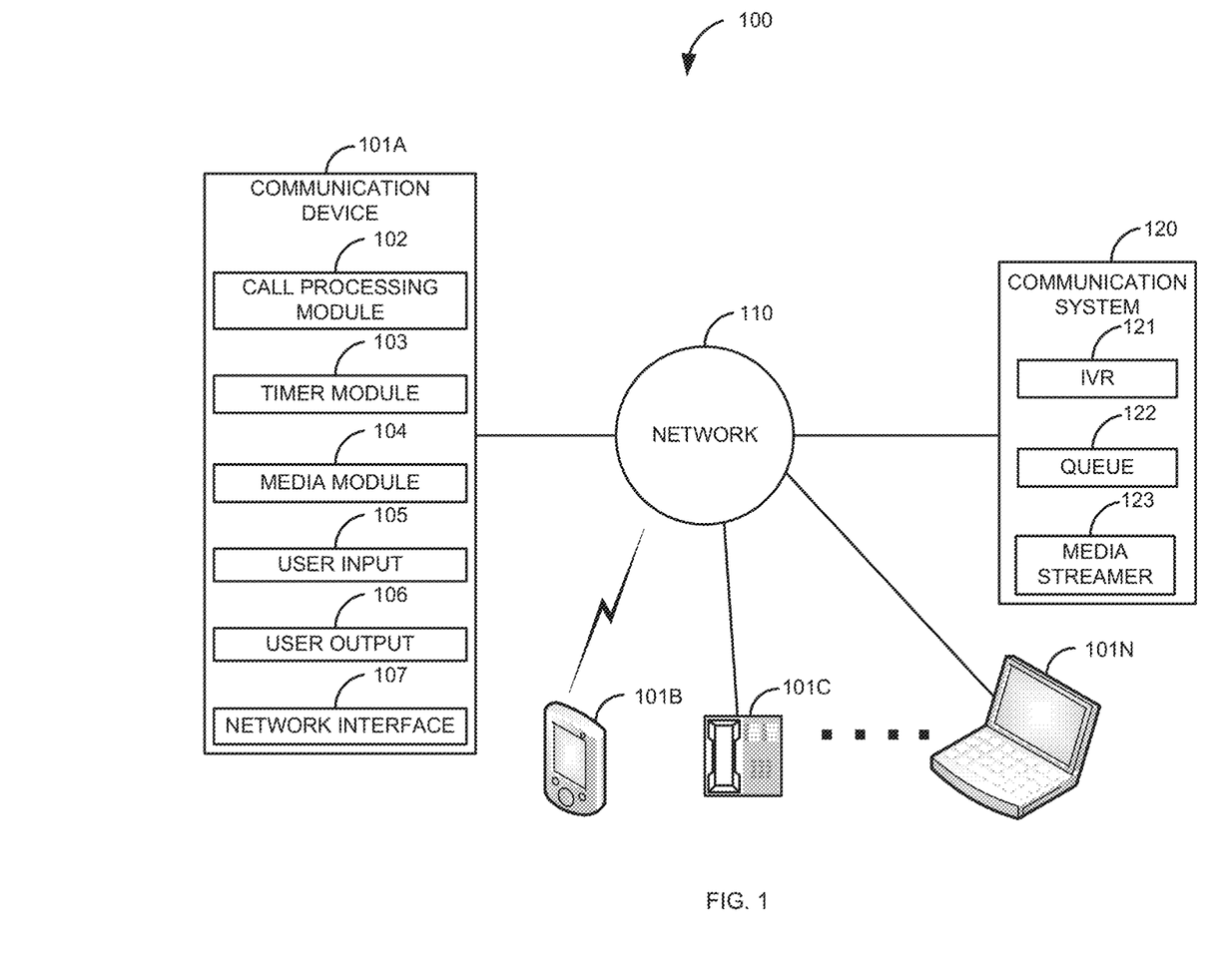
FIG. 1 is a block diagram of a first illustrative system for early media handling.

FIG. 1 is a block diagram of a first illustrative system 100 for early media handling. The first illustrative system 100 comprises communication devices 101A-101N, a network 110, and a communication system 120.

The communication device 101 can be or may include any device that can communicate on the network 110, such as a Personal Computer (PC), a telephone, a video system, a cellular telephone, a Personal Digital Assistant (PDA), a tablet device, a notebook device, an IVR system 121, a queue 122, a media streamer 123, a voice messaging system, and the like. As shown in FIG. 1, any number of communication devices 101A-101N may be connected to network 110, including only a single communication device 101. In addition, the communication device 101 may be directly connected to the communication system 120.

The communication device 101 further comprises a call processing module 102, a timer module 103, a media module 104, user input 105, user output 106, and a network interface 107. The call processing module 102 can be any hardware that in conjunction with software can process calls, such as voice calls, video calls and/or the like. The call processing module 102 may comprise a processor, a microprocessor, a digital signaling processor, an Application Specific Processor, and/or the like. For example, the call processing module 102 may be a microprocessor that executes software to handle Session Initiation Protocol (SIP) calls.

The timer module 103 can be or may include any hardware/software that can provide timing, such as an oscillator, a timer in a microprocessor, a timer in a processor, a hardware timer, and/or the like. For example, the timer module 103 may be a digitally controlled timer in a microprocessor that generates an interrupt when the timer expires.

The media module 104 can be or may include any hardware/software that can process a media stream. For example, the media module 104 can handle Real-Time Protocol (RTP) media streams. The media module 104 can handle a variety of media streams, such as audio streams, video streams, multimedia streams, and/or the like. Video/multimedia streams may include video conferencing in addition to other media, such as, whiteboards, documents, and/or the like.

The user input 105 can be or may include any hardware that allows a user to provide input to the communication device 101, such as, a mouse, a trackball, a touch screen, a microphone, a keyboard, a key pad, a touch pad, and/or the like. The user output 106 can be or may include any hardware that provides output to a user, such as a visual display, a speaker, a vibrator, and/or the like.

The network interface 107 can be or may include any hardware that allows the communication device 101 to communicate with the network 110, such as an Ethernet Interface, a wireless interface, a WiFi interface, a fiber optic interface, a cellular interface, a wired interface, and/or the like. The network interface 107 may include multiple network interfaces 107.

Although the communication devices 101B-101N do not show elements 102-107, the communication devices 101B-101N may include the elements 102-107. In other embodiments, the communication devices 101B-101N may only have a subset of elements 102-107. For example, the communication devices 101B-101N may be generic communication devices without the call processing module 102 (for supporting the processes described in FIGS. 2-5), the timing module 103, and the media module 104.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a video network, a combination of these, and the like. The network 110 can use a variety of electronic protocols, such as Ethernet, Internet Protocol (IP), Session Initiation Protocol (SIP), Integrated Services Digital Network (ISDN), video protocols, H.323, Real-Time Protocol (RTP), and/or the like. Thus, the network 110 is an electronic communication network 110 that allows for sending of messages via packets and/or circuit switched communications.

The communication system 120 can be any hardware/software that can provide call handling services for the network 110, such as, a Private Branch Exchange (PBX), central office switch, a router, a call manager, a proxy server, a session border controller, and/or the like. The communication system 120 is shown separate from the network 110, however, in some embodiments, the communication system 120 may be part of the network 110. For example, the communication system 120 may be part of an enterprise network 110 that includes the communication devices 101A-101N. The communication system 120 can provide call handling services, such as, routing for various kinds of calls. For example, the communication system 120 can route voice calls, video calls, multimedia calls, and/or the like. The communication system 120 may comprise one or more communication systems 120. For example, a first communication system (e.g., 120A) may fork a call to two different communication systems (e.g. 120B and 120C). In other examples, the communication system 120 may be in a service provider's network 110 adjacent to the network 110 where the call originated from.

In this exemplary embodiment, the communication system 120 further comprises an Interactive Voice Response (IVR) system 121, a queue 122, and a media streamer 123. The IVR system 121 can be or may include any hardware/software that can provide interaction with a caller. The IVR system 121 is typically used in conjunction with routing a call (i.e., voice or video) to a specific user. For example, the IVR system 121 may be part of a contact center menu that is used to route the call to a particular agent in the contact center. Other examples of IVR systems 121 can be where a caller is asked to provide an extension number to reach a specific party.

The queue 122 can be or may include any hardware/software that can hold one or more calls for a period of time. For example, the queue 122 may be a contact center queue 122 that is used to hold calls until an agent comes available to service the call.

The media streamer 123 can be or may include any hardware/software that can stream messages to a communication device 101. The media streamer 123 can stream messages in a variety of formats, such as in RTP, HTTP Live Streaming, Dynamic Streaming over HTTP, and/or the like.

Although the IVR system 121, the queue 122, and the media streamer 123 are shown as part of the communication system 120, in some embodiments, the IVR system 121 the queue 122, and the media streamer 123 may be separate from the communication system 120. For example, the IVR system 121, the queue 122, and the media streamer 123, may be part of a separate contact center.

Figure 2:
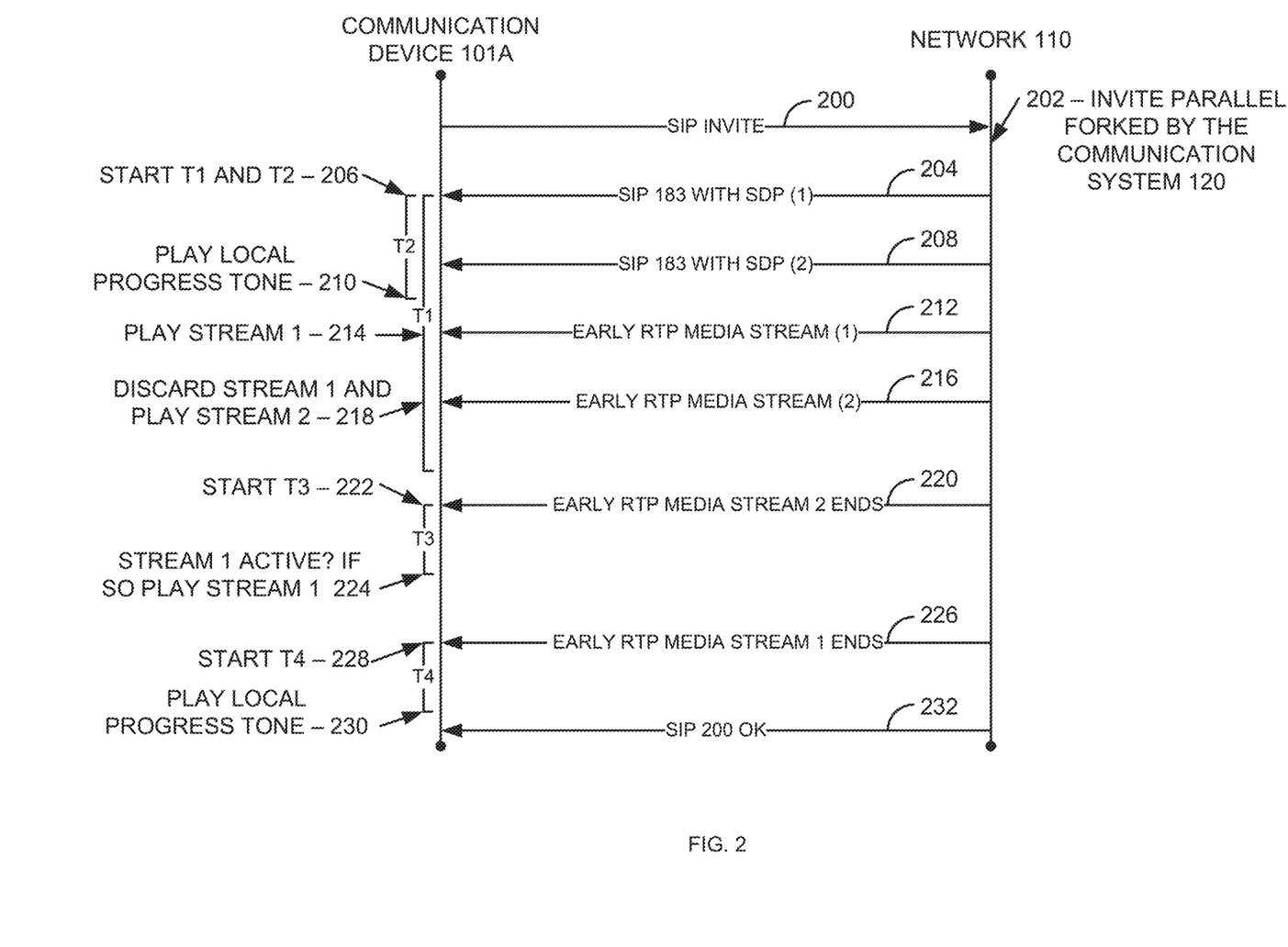
FIG. 2 is a flow diagram of a process for early media handling with multiple early media streams.

FIG. 2 is a flow diagram of a process for early media handling with multiple early media streams. Illustratively, the communication devices 101A-101N, the call processing module 102, the timer module 103, the media module 104, the network interface 107, the communication system 120, the IVR system 121, the queue 122, and the media streamer 123 are stored-program-controlled entities, such as a computer or processor, which performs the method of FIGS. 2-5 and the processes described herein by executing program instructions stored in a non-transitory computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

FIG. 2 shows a communication flow between the communication device 101A and the network 110. Particular details of what elements (e.g., the communication system 120, the IVR system 121, the queue 122, the media streamer 123, and the communication devices 101B-101N) handle the messages are not always disclosed in FIGS. 2-4 for simplicity. However, some exemplary implementations are discussed for illustrative purposes. One of skill in the art would recognize that the calls of FIGS. 2-5 would be processed using well know SIP call handling. In addition, although the process described in FIGS. 2-5 uses RTP for the early media streams, other protocols may be used instead of RTP.

The process starts in step 200 when the call processing module 102 sends a SIP INVITE message to the network 110 (e.g., the communication system 120). In this case, the communication system 120 forks the call using parallel forking in step 202. When a call is parallel forked, the SIP INVITE is sent to two or more different destinations at the same time (e.g., telephone numbers). The communication system 120 receives the SIP INVITE of step 200 and in response, sends two or more SIP INVITEs to different devices. The particular destinations that the call is parallel forked to may be based on user or system preferences. For example, a user may implement Avaya's EC500™ service to fork an incoming call to a user's office telephone to also call the user's cell phone at the same time. This way, the user may receive the call even if he/she has stepped away from the office. Another example of parallel forking can be where a call is parallel forked to two different contact center queues 122 based on a priority or other rule. A call may be parallel forked between two different IVR systems 121, queues 122, media streamers 123, communication devices 101, and/or the like.

In FIG. 2, the SIP INVITE is parallel forked to two different devices (e.g., communication devices 101B-101N, IVR system 121, queue 122, and/or media streamer 123). In response, the devices may send one or more SIP provisional response messages. A SIP provisional response message may be any 1XX class response. For example, in step 204, the call processing module 102 receives a first SIP 183 session in progress message with Session Description Protocol (SDP) information from the one of the two different devices. The SIP 183 session in progress message is one example of a type of SIP provisional response message (a 1XX class response) that may be received in steps 204 and 208. For example, the SIP provisional response message sent in step 204 may be a SIP 180 RINGING message, a SIP 181 Call is Being Forwarded message, a SIP 182 Queued message, or any other SIP provisional response messages. The receipt of the SIP 183 session in progress message in step 204 may be time stamped for use with the Timers 1 and the Timer 2 (discussed below).

The SDP information in the SIP 183 session in progress message indicates that there is an early media stream associated with the SIP 183 session in progress message. The SDP information can then be used to identify a corresponding media stream when the media stream is sent to the communication device 101A.

When the call processing module 102 receives the SIP 183 Session in Progress message in step 204, the timer module 103 starts two timers in step 206. The Timer 1 (T1) is a longer timer (e.g., 6 seconds) and the Timer 2 (T2) is a shorter timer (e.g. 2 seconds). The Timer 1 is used for detecting provisional response messages where sequential forking is used (described in FIGS. 3 and 4). When Timer 1 expires, this indicates that the call has been sequentially forked. The Timer 2 is used for determining whether to start playing a call progress tone if an early media stream is not received before the Timer 2 expires.

The call processing module 102 receives a second SIP 183 session in progress message with SDP information in step 208. This can also be time stamped. The Timer 2 expires in step 210. In response to the Timer 2 expiring in step 210, the media module 104 plays a local progress tone via the user output 106. The local progress tone may vary based on implementation and/or context. In this example, the local progress tone may be a message indicating that the call session is still in progress. In other embodiments, the local progress tone may be a ringing message. If the early RTP media stream of step 212 or step 216 is received before Timer 2 expired, then the local progress tone of step 210 is not necessary.

The media module 104 receives, in step 212, a first early RTP media stream associated with the SIP 183 Session in Progress message of step 204. Receipt of the first early RTP media stream can be time stamped by the media module 104. In response to receiving the first early RTP media stream in step 212, the media module 104 plays, in step 214, the first early RTP media stream via the user output 106.

The media module 104 receives, in step 216, a second early RTP stream associated with the SIP 183 Session in Progress message of step 208. Receipt of the second early RTP media stream can be time stamped by the media module 104. In response to receiving the second early RTP media stream in step 216 (before the Timer T1 has expired), the media module 104, in step 218, discards the first early RTP media stream and plays the second early RTP media stream via the user output 106.

The second early RTP media stream ends in step 200. The second early RTP media stream can end in various ways. For example, the second early RTP media stream may just stop. Alternatively the media module 104 may receive a SIP UPDATE message that indicates the second early RTP media stream is inactive or identifies a 0 port number. In response to the second early RTP media stream ending in step 220, the timer module 103 starts Timer 3 (T3) in step 222. The Timer 3 has a short duration (e.g., 1 second).

In step 224, the Timer 3 expires. In response to the Timer 3 expiring, the media module 104 determines, in step 224, if the first early RTP media stream is active. If the first early RTP media stream is still active (i.e., being received) in step 224, the media module 104 plays the first early RTP media stream via the user output 106. If the first early RTP media stream is not active in step 224, the media module 104 would play a local progress tone.

The first early RTP media stream ends in step 226. The first early RTP media stream can end in the same manner as discussed in step 216 for the second early RTP media stream. In response to the first early RTP media stream ending in step 226, the timer module 103 starts Timer 4 (T4) in step 228. The Timer 4 has the same purpose as the Timer 3, which is to play a local progress tone when the timer particular timer expires. The Timer 4 expires in step 230. In response to the Timer 4 expiring in step 230, the media module 104 plays a local progress tone in step 230.

The call processing module 102 receives a SIP 200 OK in step 232. The SIP 200 OK is a response from one of the devices that received the forked SIP INVITE of step 202. The SIP 200 OK indicates that the call is now setup (i.e., has been answered by a human or voice mail system).

To illustrate, consider the following examples. Assume that the SIP INVITE of step 200 is parallel forked to a conferencing IVR system 121 and a user's cell phone 102 in step 202. The conferencing IVR system 121 sends the SIP 183 message of step 204. A media streamer 123 (of the user's cell phone service provider) sends the SIP 183 message of step 208. The conferencing IVR system 121 sends the early media stream of step 212. The early RTP media stream of the conferencing IVR system 121 is a message prompting the user to provide a Personal Identification Number (PIN) for accessing a conference call. The early media stream of the conferencing IVR system 121 begins playing. The media streamer 123 sends a call progress message stating "please wait while I connect you to the network" in step 216. Alternatively, the call progress message may be a message indicating that "the call cannot be completed as dialed." In response the media module 104 starts discarding the first RTP media stream from the conferencing IVR system 121 and begins playing the call progress message "please wait while I connect you to the network" in step 218. After the call progress message "please wait while I connect you to the network" ends in step 220, the media module 104 determines in step 224 that the early RTP media stream of the conferencing IVR system 121 is still active. The media module 104 plays the early RTP media stream of the conferencing IVR system 121 in step 224. If the early media RTP stream of the conferencing IVR system 121 ends in step 226, the media module 104 plays a local progress tone in step 230. The 200 OK is received when the user answers his/her cell phone 101 in step 232.

Example 2

Assume that the SIP INVITE of step 200 is forked to two contact center queues 122 in step 202. The forking is done based on a contact center rule that forks calls for specific users because of an importance of the user. For example, the user may have a service agreement that provides for enhanced service so an incoming call is forked to two call queues 122 that have the shortest wait period. In steps 204 and 208, the respective contact center queue 122 send a SIP 182 Queued message (instead of the SIP 183 messages) in response to the forked SIP INVITE of step 202. The first early RTP media stream for (i.e., music on hold) is received in step 212 and played in step 214. The second early media RTP stream (i.e., music on hold), is received in step 216. The first media stream is discarded and the second early RTP media stream is played in step 218. The early media streams may optionally end as disclosed in step 220-230. When a contact center agent answers the call from one of the contact center queues 122, the 200 OK is sent in step 232. The user is then connected to the contact center agent.

Figure 3:
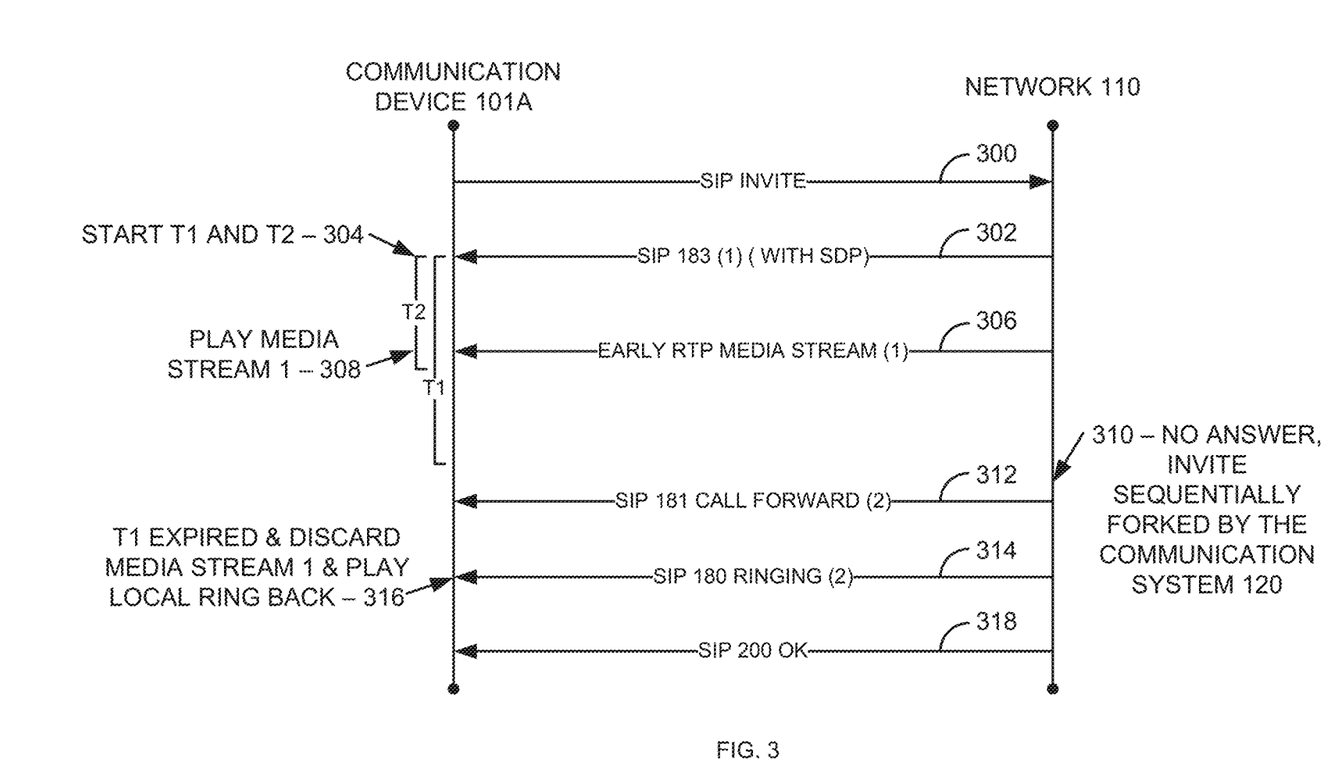
FIG. 3 is a flow diagram of a process for early media handling for sequentially forked calls.

FIG. 3 is a flow diagram of a process for early media handling for sequentially forked calls. A sequentially forked call is a call that is initially routed a first device (e.g., a first telephone number). If the call is unanswered for a period of time (or based on a defined event), the call is then forwarded to a second device (e.g., a second telephone number). For example, a supervisor may have his calls routed to a secretary if he does not answer his call within six seconds.

The process starts in step 300 when the call processing module 102 sends a SIP INVITE in step 300. The receiving element (e.g., the device associated with a telephone number) responds by sending a SIP 183 Session in Progress message with SDP information in step 302 to the call processing module 102. In response to receiving the SIP 183 Session in Progress message with SDP information of step 302, the timer module 103 starts the Timers 1 and 2 in step 304 (like in FIG. 2). The communication device 101A receives the early RTP media stream in step 306. Since the early RTP media stream was received before Timer 2 (the timer used for playing local progress tones) has expired, the media module 104 plays the early RTP media stream via the communication output 106 in step 308.

The receiving element of the SIP INVITE of step 300 does not answer the call in step 310. As a result, the communication system 120 sequentially forks the call by forwarding the call to a second element in step 310. This results in the second element responding by sending a SIP 181 call is being forwarded message to the call processing module 102 in step 312. This is after the expiration of the Timer 1, which is used to detect sequential forking. The communication device 101A (call processing module 102) may play a local progress tone as a result of receiving the SIP 181 call is being forwarded message in step 312. The local progress tone may be superimposed on the early media stream received from the network 110. Since there is no SDP information associated with the call is being forwarded message of step 312, the media module 104 does not expect a media stream to be sent. The SIP 181 call is being forwarded message indicates a second network element that the call is being forwarded to. The second network element sends a SIP 180 RINGING message with no Session Description Protocol to the call processing module 102 in step 314. In response to the SIP 180 RINGING message, the media module 104 discards the early RTP media stream of step 306 and plays a local ring back message in step 316. The second element sends a 200 OK message indicating that the forward call to the second element has been answered in step 318.

To illustrate, consider the following example. A caller (Joe) wants to call his supervisor Sally from his telephone 101A. Joe dials Sally's telephone number resulting in Joe's telephone 101A sending the SIP INVITE of step 300 to Sally's telephone 101B. The communication system 120 responds with the SIP 183 message in step 302. The media streamer 123 sends the early RTP media stream in step 306. The early RTP media stream is a message of step 306 says the call is being made to Sally. The early RTP media stream is played to Joe at the telephone 101A in step 308.

Sally does not answer the call. Sally has defined a rule that if she does not answer the call within eight seconds, her calls will be forwarded to her secretary Bob at his telephone 101C. Based on this rule, the call from Joe is sequentially forked and the call is forwarded to Bob's telephone 101C step 310. This results in the communication system 120 sending the SIP 181 call is being forwarded message in step 312. The call is forwarded to Bob's telephone 101C, which sends the SIP 180 RINGING message of step 314 to Joe's telephone 101A. The SIP 180 RINGING message results in the local ring back message being played to Bob in step 316. Bob answers the call, resulting in Bob's telephone 101C sending the SIP 200 OK message to Joe's telephone 101A in step 318.

Figure 4:
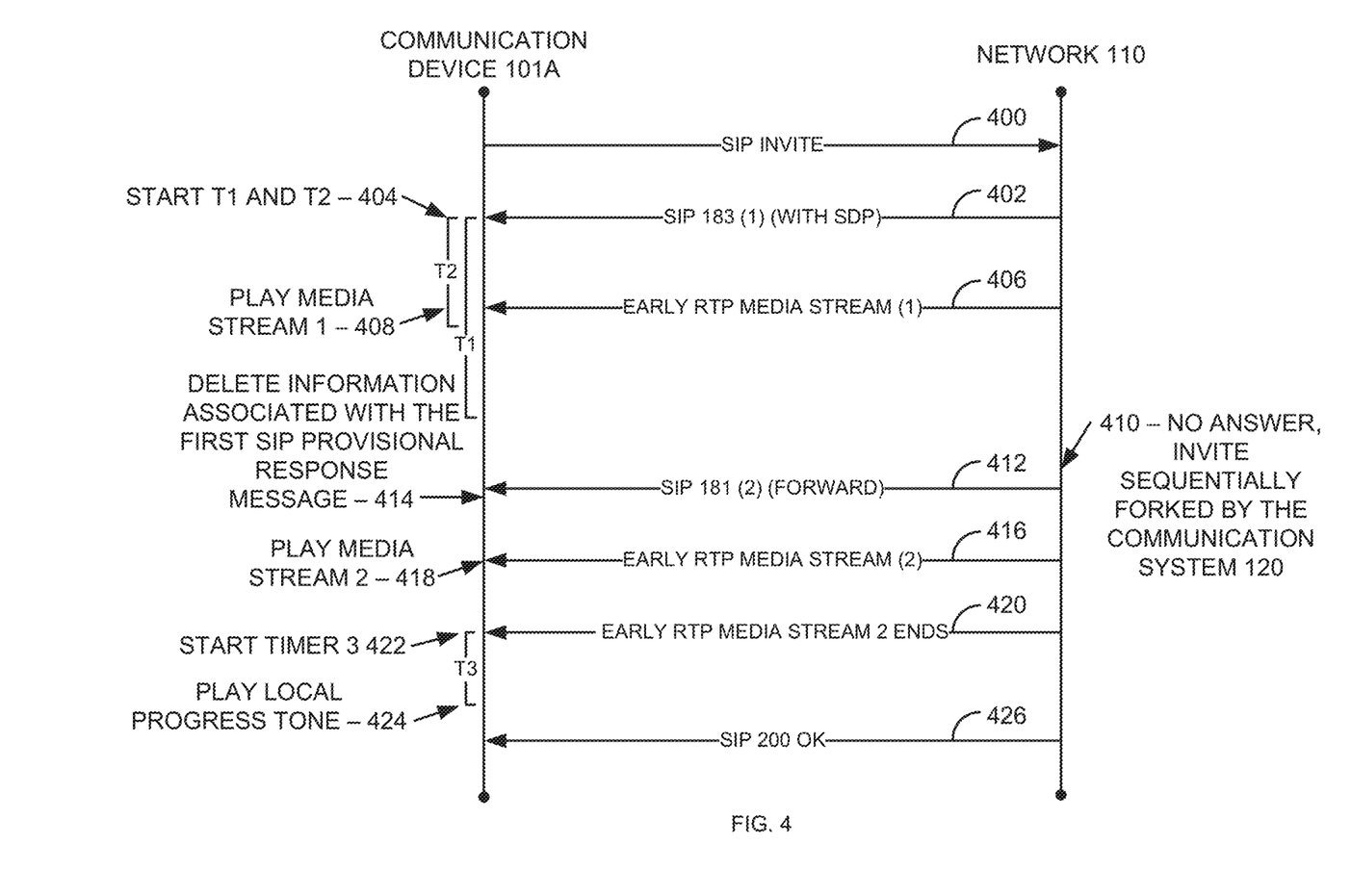
FIG. 4 is a flow diagram of a process for early media handling for sequentially forked calls.

FIG. 4 is a flow diagram of a process for early media handling for sequentially forked calls. The process starts in step 400 when the call processing module 102 sends a SIP INVITE in step 400. In response to the SIP INVITE, a SIP 183 session in progress message with the SDP information (to indicate there is an associated media stream) is sent to the call processing module 102 in step 402. The timer module 103 starts the Timer 1 and the Timer 2 in step 404. The media module 104 receives the first early RTP media stream in step 406. In response to receiving the first early RTP media stream in step 406, the media module 104 plays the first early RTP media stream via the user output 106 in step 408.

Based on the call not being answered, the call is forwarded (sequentially forked) to a second entity in step 410. In response to the call being forwarded to the second entity, the communication system 120 sends a SIP 181 call being forwarded message to the call processing module 102 in step 412. This is after the expiration of the Timer 1, which is used to detect sequential forking. In response, the call processing module 102 deletes, in step 414, the information (i.e., SDP information) associated with the SIP 183 call in progress message of step 402. Since the call has been forwarded, the call processing module 102 no longer needs to keep track of the initial call information (from step 402/406).

The media module 104 receives the second early RTP media stream in step 416. In response to receiving the second early RTP media stream, the media module 104 plays the second early RTP media stream via the user output 106 in step 418. The second early RTP media stream ends in step 420 (e.g., as described previously). In response to the second early RTP media stream ending in step 420, the timer module 103 starts the Timer 3 (T3). When the Timer 3 expires in step 424, the media module 104 plays a local progress tone via the user output 106 in step 424. The call processing module 102 receives the SIP 200 OK message from the second entity in step 426. The SIP 200 OK message indicates that the call has been answered by the second entity.

Figure 5:
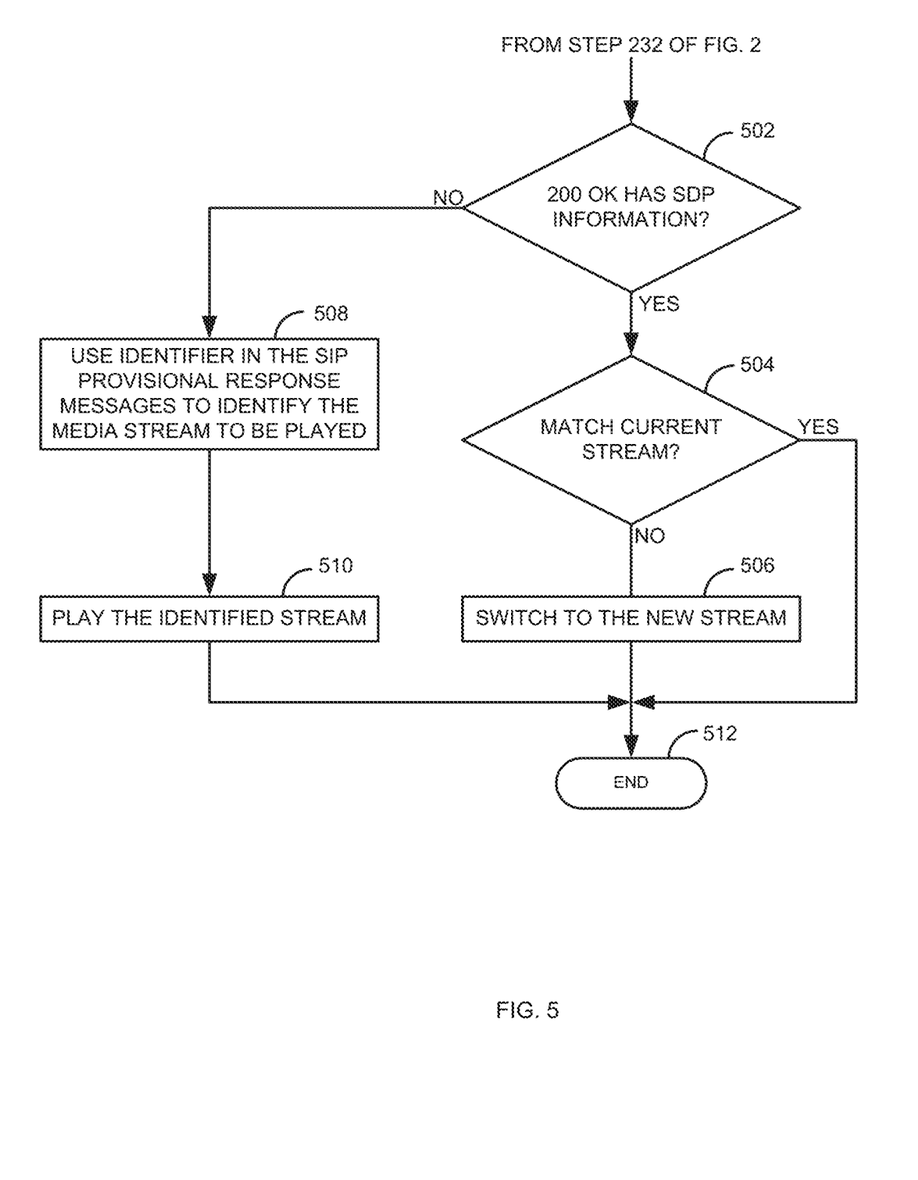
FIG. 5 is a flow diagram for identifying the correct media stream to play.

FIG. 5 is a flow diagram for identifying the correct media stream to play. The process of FIG. 5 assumes that the first early RTP media stream (of step 212) and the second early RTP media stream (of step 216) did not end in step 220 and 226 (i.e., steps 220-230 have not occurred when the SIP 200 OK message is received in step 232). At this point, the second early RTP media stream will still be playing when the SIP 200 OK message of step 232 is received. In addition, the media module 104 is still receiving the first early RTP media stream (of step 212) and is discarding the first early RTP media stream.

The call processing module 102 determines, in step 502 if the SIP 200 OK message (of step 232) has SDP information. If the SIP 200 OK message has SDP information in step 502, the media module 104 determines if the SDP information matches the media stream that is currently being played in step 504. If the SDP information matches the media stream currently being played in step 504, the process goes to step 512 and ends. Otherwise, if the SDP information is for a different media stream, the media module 104 switches the media stream to the new media stream in step 506 and the process ends in step 512.

If the SIP 200 OK message does not have SDP information in step 502, the media module 104 uses an identifier in the SIP provisional response messages and the SIP 200 OK message in step 508. The media module 104 can match an early RTP media stream in various ways. For example, the media module 104 may use a SIP To: tag in the headers of the SIP provisional response messages and the SIP 200 OK. Based on identifying the correct early RTP media stream, the media module 104 plays the correct RTP media stream in step 510.

The above processes have all been described using SIP/RTP. However, in other embodiments, other protocols may be used instead of SIP and/or RTP. For example, the above processes may use H.323, Representation State Transfer (REST), video protocols, and/or the like instead of SIP and/or RTP.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
sending a Session Initiation Protocol (SIP) INVITE message to establish a call;
in response to sending the SIP INVITE message, receiving first and second SIP provisional response messages;
receiving a first media stream associated with one of the first or the second SIP provisional response messages;
playing the first media stream;
receiving a second media stream associated with the other one of the first or the second SIP provisional response messages;
determining that the first and second media streams are received within a first time period; and
in response to receiving the second media stream, discarding the first media stream in favor of playing the second media stream.

2. The method of claim 1, further comprising:
in response to receiving the first and second SIP provisional response messages, determining if either of the first or second media streams have been received within a second time period, wherein the second time period is shorter than the first time period; and
in response to determining that neither of the first or second media streams have been received within the second time period, playing a local progress tone.

3. The method of claim 1, further comprising:
after receiving the first and second SIP provisional response messages, receiving a SIP 180 RINGING message;
determining that the first time period has expired before receiving the SIP 180 RINGING message; and
in response to determining that the first time period has expired before receiving the SIP 180 RINGING message, discarding the second media stream and begin playing a local ring back signal.

4. The method of claim 1, wherein the second SIP provisional response message is a SIP 181 call is being forwarded message and further comprising: deleting any information associated with the first SIP provisional response message in response to receiving the SIP 181 call being forwarded message.

5. The method of claim 1, further comprising:
detecting that the second media stream has ended;
in response to detecting that the second media stream has ended, determining if the first media stream is still active;
in response to determining that the first media stream is still active, playing the first media stream; and
in response to determining that the first media stream is not active, playing a local progress tone.

6. The method of claim 5, wherein detecting that the second media stream has ended is based on receiving a SIP UPDATE message that indicates the second media stream is inactive or identifies a 0 port number.

7. The method of claim 1, further comprising:
receiving a SIP 200 OK message in response to the SIP INVITE;
in response to receiving the SIP 200 OK message, determining if the SIP 200 OK message includes Session Description Protocol (SDP) information; and
if the SIP 200 OK message includes the SDP information:
determining if the SDP information is associated with the first media stream; and
in response to determining that the SDP information is associated with the first media stream, playing the first media stream.

8. The method of claim 1, wherein the first and second media streams use Real-Time Protocol.

9. The method of claim 1, wherein the first and second SIP provisional response messages comprise at least one of the following: a SIP 180 RINGING message, a SIP 181 Call is Being Forwarded message, a SIP 182 Queued message, and a SIP 183 Session in Progress message.

10. The method of claim 1, further comprising:
time stamping receipt of the first and second SIP provisional response messages;
time stamping receipt of the first and second media streams; and
tracking SIP Synchronization Source Identifiers for the first and second media streams.

11. A communication device comprising:
a call processing module that sends a Session Initiation Protocol (SIP) INVITE message to establish a call and receives first and second SIP provisional response messages in response to sending the SIP INVITE message;
a media module that receives a first media stream associated with one of the first or the second SIP provisional response messages, plays the first media stream, receives a second media stream associated with the other one of the first or the second SIP provisional response messages, discards the first media stream and plays the second media stream in response to receiving the second media stream; and a timer module that determines that the first and second media streams are received within a first time period.

12. The communication device of claim 11, wherein:

the timer module determines if either of the first or second media streams have been received within a second time period, which is shorter than the first time period, in response to receiving the first and second SIP provisional response messages; and the media module plays a local progress tone in response to determining that neither of the first or second media streams have been received within the second time period.

13. The communication device of claim 11, wherein:

after receiving the first and second provisional response messages, the call processing module receives a SIP 180 RINGING message;

the timer module determines that the first time period has expired before receiving the SIP 180 RINGING message; and the media module discards the second media stream and begins playing a local ring back signal in response to determining that the first time period has expired before receiving the SIP 180 RINGING message.

14. The communication device of claim 11, wherein the second SIP provisional response message is a SIP 181 call is being forwarded message and wherein the call processing module deletes any information associated with the first SIP provisional response message in response to receiving the SIP 181 call being forwarded message.

15. The communication device of claim 11, wherein:

the media module detects that the second media stream has ended, determines if the first media stream is still active in response to detecting that the second media stream has ended, plays, the first media stream in response to determining that the first media stream is still active, and plays a local progress tone in response to determining that the first media stream is not active.

16. The communication device of claim 15, wherein detecting that the second media stream has ended is based on receiving a SIP UPDATE message that indicates the second media stream is inactive or identifies a 0 port number.

17. The communication device of claim 11, wherein:

the call processing module receives a SIP 200 OK message in response to the SIP INVITE, determines if the SIP 200 OK message includes Session Description Protocol (SDP) information in response to receiving the SIP 200 OK message, and if the SIP 200 OK message includes the SDP information: determines if the SDP information is associated with the first media stream and plays the first media stream in response to determining that the SDP information is associated with the first media stream.

18. The communication device of claim 11, wherein:

the call processing module receives a SIP 200 OK message in response to the SIP INVITE, determines if the SIP 200 OK message includes Session Description Protocol (SDP) information in response to receiving the SIP 200 OK message, and uses an identifier in one of the first or second SIP provisional response message to identify which of the first or second media streams needs to be played if the SIP 200 OK message does not include the SDP information.

19. The communication device of claim 11, wherein:

the call processing module time stamps receipt of the first and second SIP provisional response messages; and the media module time stamps receipt of the first and second media streams, and track SIP Synchronization Source Identifiers for the first and second media streams.

20. A method comprising:

sending a Session Initiation Protocol (SIP) INVITE message to establish a call;

starting a timer to detect sequential forking;

in response to sending the SIP INVITE message, receiving a first provisional response message;

receiving a first media stream associated with the first provisional response message;

playing the first media stream;

receiving a second provisional response message after the timer to detect sequential forking has expired; and in response to receiving the second provisional response message after the timer to detect sequential forking has expired, doing at least one of:

playing a local progress tone; and playing an early media stream associated with the second provisional response message.

* * * * *

UNITED STATES PATENT AND TRADEMARK OFFICE
CERTIFICATE OF CORRECTION

PATENT NO. : 10,931,719 B2
APPLICATION NO. : 14/691253
DATED : February 23, 2021
INVENTOR(S) : Mehmet C. Balasaygun et al.

Page 1 of 1

It is certified that error appears in the above-identified patent and that said Letters Patent is hereby corrected as shown below:

In the Claims

At Column 12, Line 26, delete "track" and insert --tracks-- therein.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*